Aug. 24, 1965 K. WILFERT 3,202,452
AUTOMOBILE BODY SUPPORTING AND REINFORCING STRUCTURE
Filed April 8, 1963 3 Sheets-Sheet 1

INVENTOR
Karl Wilfert
Dicke & Craig
BY
ATTORNEYS

Aug. 24, 1965   K. WILFERT   3,202,452
AUTOMOBILE BODY SUPPORTING AND REINFORCING STRUCTURE
Filed April 8, 1963   3 Sheets-Sheet 2

INVENTOR
Karl Wilfert
Dicke & Craig
BY
ATTORNEYS

United States Patent Office 3,202,452
Patented Aug. 24, 1965

3,202,452
AUTOMOBILE BODY SUPPORTING AND
REINFORCING STRUCTURE
Karl Wilfert, Stuttgart-Degerloch, Germany, assignor to
Daimler-Benz Aktiengesellschaft, Stuttgart, Germany
Filed Apr. 8, 1963, Ser. No. 271,361
Claims priority, application Germany, Apr. 12, 1962,
D 38,658
5 Claims. (Cl. 296—28)

The present invention relates to the structure of a car body, and it is the principal object of the invention to provide a car body, the upper part of which is designed so that the view from the car, especially to the rear and from the sides thereof, is practically unobstructed by solid opaque wall surfaces, door posts, or the like.

In accordance with the invention, the top of the car, instead of being supported by the usual door posts, front and rear posts and intermediate opaque wall surfaces, is supported solely by four narrow posts, the two rear posts of which are separated from each other at the base of the upper part of the car body by a distance which is smaller than the width of this base. Due to their shape and particular position, these rear posts form a good support for the top of the car and hardly obstruct the view from the inside toward the sides and rear of the car. If additional sealing strips are required between adjacent panes of the side windows, they may be made very narrow even if provided with reinforcing inserts, and will therefore also hardly obstruct the view from the car.

According to another feature of the invention the rear posts are preferably also secured to the rear edge of the top of the car at a distance from each other which is less than the width of the top and they may also be extended longitudinally in the form of slightly projecting ribs along the top of the car to the frame of the windshield. These ribs reinforce the top and may also serve as supports of a luggage frame or luggage carrier. In this case, the ribs are preferably provided with special connecting points, for example, suitable recesses or projections, for locating the luggage carrier or frame in the proper position, for permitting it to be easily and quickly secured to or removed from the top of the car, and preventing it from shifting along the supporting ribs in the longitudinal direction thereof.

The rear posts may additionally serve for the purpose of ventilating the inside of the car by being provided with air inlet or outlet ports which may be opened or closed by suitable means from the inside of the car.

Another important feature of the invention consists in also using the lower ends of the rear posts as supports for the trunk lid which may then be hinged directly to these ends above the upper surface of the lid. The lower ends of the rear posts which are secured to the lower body of the car may, however, also slightly project into the trunk compartment, and these projecting ends may support the pivoting means for the trunk lid. For solidifying the trunk lid, a pair of reinforcing bars may also be secured either to the outer or inner surface thereof and preferably in a position in alignment with the lower ends of the rear posts so as substantially to abut against them when the lid is in the closed position. If the rear posts are made of a tubular construction, they may also serve as housings in which the compensating springs for the trunk lid may be mounted.

A further object of the invention is to protect the rear inside part of the car from sunlight. This may be accomplished by providing the windows at the rear of the car, and especially those adjacent to the rear window, with Venetian or other adjustable blinds. Further features of the invention may then consist in employing the rear posts to guide these blinds or, if these posts are tubular, to enclose and hide the cords for operating the blinds.

The features and advantages of the present invention will become more clearly apparent from the following detailed description thereof which is to be read with reference to the accompanying drawings, in which FIGURE 1 shows a perspective view of a passenger car according to the invention, as seen at an oblique angle from the rear of the car;

FIGURE 6 shows a perspective view of a passenger car similar to that as shown in FIGURE 1, but with a luggage frame mounted thereon; while

Figure 1:
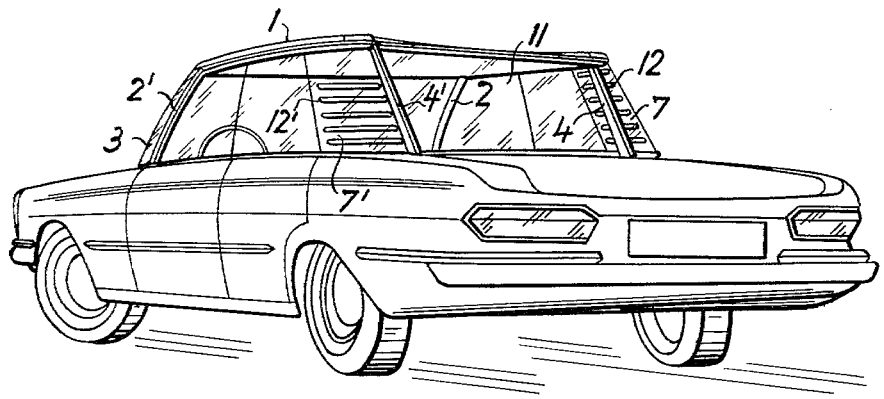

Referring first to FIGURE 1 of the drawings, the top 1 of the car according to the invention is supported by four posts. The two front posts 2 and 2' are provided in the conventional manner at the lateral ends of the windshield 3. The rear posts 4 and 4' are connected to the rear end of the top 1 and the distance between them on the top 1 is smaller than the width of the top. At the base of the upper part of the car body which is formed by the windows and the top, the distance between the rear posts 4 and 4' is also smaller than the width of this base.

Figure 2:
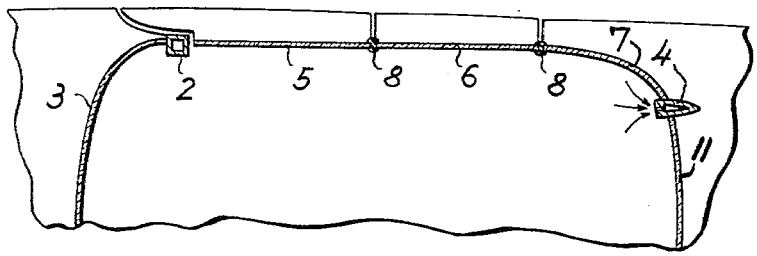
FIGURE 2 shows diagrammatically a partial horizontal section of the upper part of a car similar to that as shown in FIGURE 1.
Figure 3:
FIGURE 3 shows an enlarged detail view of a joint between two adjacent side windows as shown in FIGURE 2.
Figure 4:
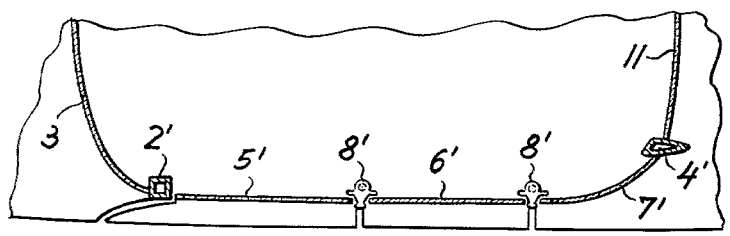
FIGURE 4 shows diagrammatically a sectional view similar to FIGURE 2, but of a modification of the invention.
Figure 5:
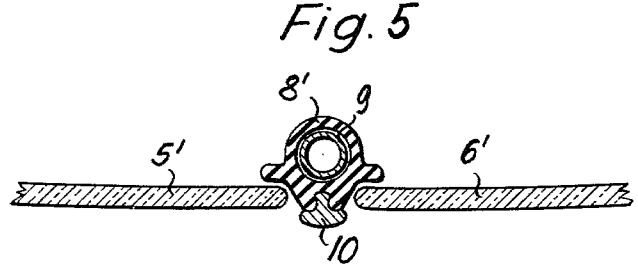
FIGURE 5 shows an enlarged detail view of the joint between two adjacent side windows as shown in FIGURE 4.

As may be clearly seen especially in FIGURES 1, 2 and 4 the view from the inside of the car toward the rear is hardly obstructed by the presence of the narrow rear posts 4 and 4' and the view is also excellent toward the sides since the lateral window surfaces are practically uninterrupted. According to the embodiment of the invention as shown in FIGURES 2 and 3, only very narrow connecting and sealing strips 8 are inserted between the adjacent panes 5, 6, and 7. The same applies to the embodiment according to FIGURES 4 and 5, in which the adjacent panes 5', 6', and 7' are separated merely by the narrow connecting and sealing strips 8', which, however, are provided with reinforcing inserts 9 and outer ornamental strips 10.

As illustrated in FIGURE 1, the area between the rear window 11 and the rear side windows 7 and 7' may be covered by separate Venetian blinds 12 and 12' which may also be raised, lowered, and adjusted to different angles separately from each other. Of course, the rear window 11 may also be covered by a Venetian blind.

As indicated in some of the drawings, the rear window 11 may extend continuously from one side of the car to the other and integrally with the rear side windows 7, 7', and the rear posts 4, 4' may then either engage with or be slightly spaced from the outer surface of this window or, as indicated in FIGURE 2, the rear window 11 and the rear side windows 7, 7' may be separate and secured to and supported by the rear posts 4, 4'. In the latter case, the rear posts may be tubular and provided with suitable upper and lower openings, and the vertical cords for operating the blinds 12, 12' and also the blind for the rear window 11, if desired, may extend through the posts 4, 4' and be guided therein and will thus not be visible at the inside of the car.

Figure 6:
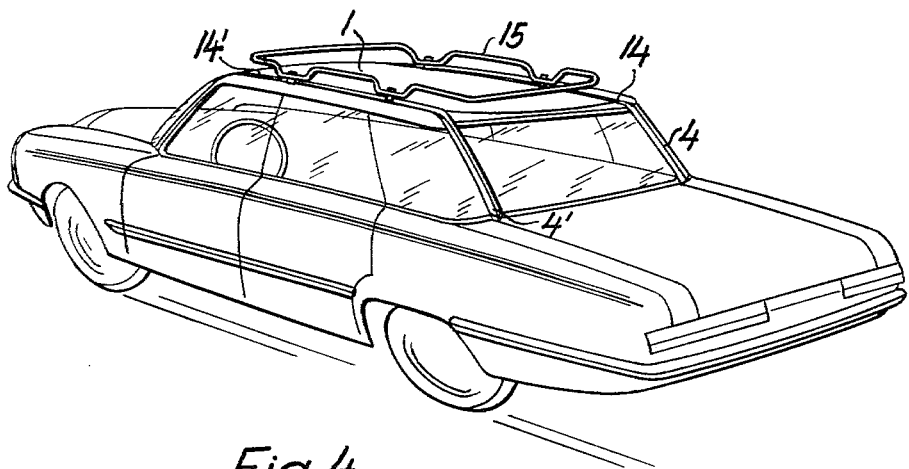

FIGURE 6 illustrates a car, the rear posts 4 and 4' of which are extended in the form of ribs 14 and 14' along the top 1 of the car which is slightly concave. These ribs 14 and 14' reinforce the top of the car and also form supports for carrying luggage or the like. In order to prevent such luggage from falling off, a luggage frame 15 may be secured to ribs 14 and 14'. If the top of the car has a solid structure, the luggage may be placed directly on it and be merely surrounded by the luggage frame 15 to which it may be strapped. If the top of the car is, however, not of a sufficiently solid structure to support such luggage directly or if the luggage should not be placed directly thereon for any other reason, for example, so as to avoid any marring of the top surface or because the top of the car might be strongly curved, transverse bars or an entire supporting grid or platform may also be connected either directly to the longitudinal ribs 14 and 14' independently of the luggage frame or to the luggage frame so as to be integral therewith or removable therefrom. As indicated in FIGURE 6, ribs 14 and 14' are preferably provided with special connecting points so as to permit such a luggage frame or luggage carrier to be quickly secured to the top of the car in the most suitable position to support a load and in a manner so as to prevent it from accidentally loosening or sliding longitudinally along the ribs 14 and 14', and also to permit it to be easily and quickly removed from the top of the car when not desired thereon.

The lower ends of posts 4 and 4' may preferably also form the hinge supports for the trunk lid 16 which may be connected thereto either above the base of the upper part of the car body or at the inside of the trunk compartment if the ends of the posts project slightly into this compartment.

Figure 7:
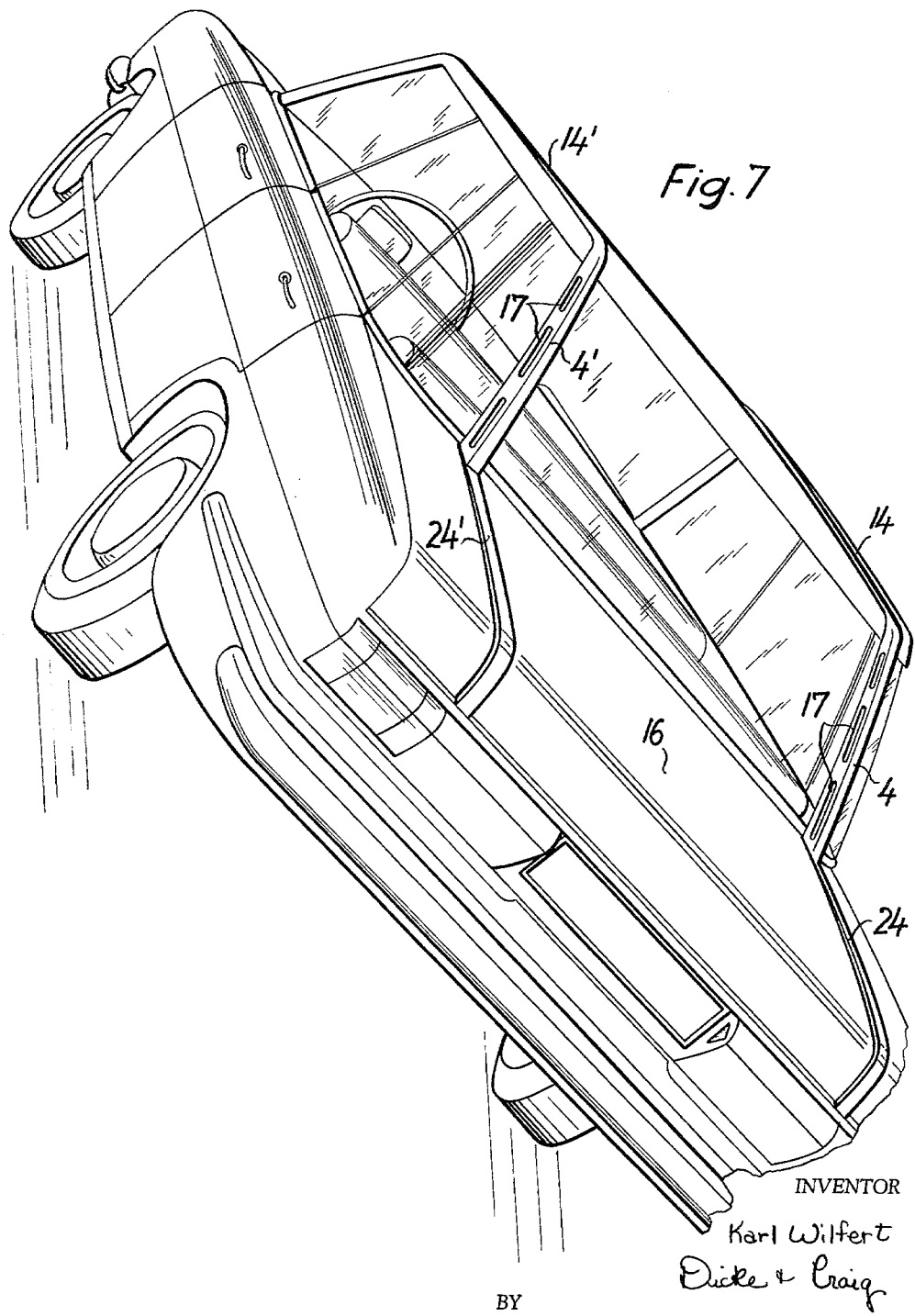
FIGURE 7 shows a perspective view of a passenger car similar to those as shown in FIGURES 1 and 6, but provided with ventilation slots in the rear posts.

As illustrated in FIGURE 7, the supporting ribs 14, 14' may extend from the windshield frame along the top of the car and integrally with the rear posts 4, 4' to the base of the upper part of the car body up to the edge of the trunk lid 16, where they may be continued on the trunk lid as separate reinforcing elements 24, 24' to the lower edge of the lid for solidifying the latter.

For the ventilation of the car, the rear posts 4, 4' may also be provided with air inlet or outlet ports 17 communicating with the car interior as seen in FIGURE 2, and which may be opened or closed by suitable means from the inside of the car.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In an automobile having a body with a lower part and an upper part, said upper part comprising a top and only a pair of front posts and a pair of rear posts secured to said lower part and to said top for supporting said top, said rear posts being very narrow and spaced from each other at a distance smaller than the width of said lower part and said top and falling within a plane which substantially coincides with the rear edge of said top so that the view from the inside of the automobile to the outside is practically unobstructed in all directions by opaque parts between said lower body part and said top, and a pair of ribs integral with said rear posts secured to said top and slightly projecting therefrom and extending longitudinally of the automobile along said top and spaced from the side edges thereof.

2. In an automobile having a body with a lower part and an upper part, said upper part comprising a top and only a pair of front posts and a pair of rear posts secured to said lower part and to said top for supporting said top, said rear posts being very narrow and spaced from each other at a distance smaller than the width of said lower part and said top so that the view from the inside of the automobile to the outside is practically unobstructed in all directions by opaque parts between said lower body and said top, and a pair of ribs integral with said rear posts secured to said top and slightly projecting therefrom at a distance from the side edges thereof and extending longitudinally of the automobile along said top, said ribs being adapted to reinforce said top and to serve as means for supporting and securing luggage on said top.

3. An automobile as defined in claim 2, in which said ribs are provided with means for locating a luggage carrier thereon in a particular position so as not to be slidable along said ribs when fastened thereon, said ribs being spaced essentially an equal distance as said rear posts.

4. In an automobile having a body with a lower part and an upper part, said upper part comprising a top and only a pair of front posts and a pair of rear posts secured to said lower part and to said top for supporting said top, said rear posts being very narrow and spaced from each other at a distance smaller than the width of said lower part and said top and falling within a plane which substantially coincides with the rear edge of said top so that the view from the inside of the automobile to the outside is practically unobstructed in all directions by opaque parts between said lower body part and said top, said rear posts having ventilating openings extending from the outside to the inside of said automobile.

5. In an automobile having a body with a lower part and an upper part, said upper part comprising a top and only a pair of front posts and a pair of rear posts secured to said lower part and to said top for supporting said top, said rear posts being very narrow and spaced from each other at a distance smaller than the width of said lower part and said top so that the view from the inside of the automobile to the outside is practically unobstructed in all directions by opaque parts between said lower body part and said top, and further comprising separate adjustable blinds adjacent to said rear posts, said blinds having cords for adjusting said blinds, said rear posts being tubular and having upper and lower openings, said cords passing through said openings into and out of said posts and along the inside of said posts.

References Cited by the Examiner

UNITED STATES PATENTS

| | | | |
|---|---|---|---|
| D. 139,452 | 11/44 | O'Kane | 296—28 X |
| D. 181,491 | 11/57 | Petry. | |
| 2,523,923 | 9/50 | Rodert. | |
| 2,580,156 | 12/51 | Brown | 296—28 |
| 2,796,286 | 6/57 | Barenyi | 296—28 |
| 2,796,288 | 6/57 | Green | 296—76 |
| 2,986,423 | 5/61 | Barenyi | 296—28 |
| 2,997,336 | 8/61 | Huggins et al. | 296—106 |
| 3,021,171 | 2/62 | Barenyi | 296—24 |
| 3,061,360 | 10/62 | Wilfert | 296—28 |
| 3,061,361 | 10/62 | Barenyi | 296—28 |
| 3,080,189 | 3/63 | Barenyi | 296—28 |
| 3,080,190 | 3/63 | Barenyi | 296—28 |

FOREIGN PATENTS 454,248   150   Italy.

OTHER REFERENCES

Article in "Automobile Engineer" of September 1961; pages 338–339, Fissore Marinella.

A. HARRY LEVY, *Primary Examiner.*